United States Patent [19]

Costanza

[11] Patent Number: 5,440,480
[45] Date of Patent: Aug. 8, 1995

[54] METHOD FOR DETERMINING FLEXIBLE DEMAND IN A MANUFACTURING PROCESS

[75] Inventor: John R. Costanza, Parker, Colo.

[73] Assignee: JIT Institute of Technology, Inc., Englewood, Colo.

[21] Appl. No.: 264,171

[22] Filed: Jun. 16, 1994

Related U.S. Application Data

[63] Continuation of Ser. No. 884,599, May 15, 1992, abandoned.

[51] Int. Cl.⁶ .................. G06F 17/60; G06G 7/52
[52] U.S. Cl. ..................... 364/401; 364/468
[58] Field of Search ............. 364/401, 402, 403, 468, 364/478, 479

[56] References Cited

PUBLICATIONS

Costanza, John R., "The Quantum Leap in Speed to Market", J-I-T Institute of Technology, 1990, pp. 89-94.

*Primary Examiner*—Gail O. Hayes
*Assistant Examiner*—Jennifer L. Hazard
*Attorney, Agent, or Firm*—James R. Young

[57] ABSTRACT

A system that determines the total demand for a product for each day over four time periods specified by the user of the system. Within the first time period, from the current date up to a demand fence, the total demand cannot be altered. For the next three periods, called the flex fence periods, the total demand for each day can vary by a percentage amount set by the user. If an order exceeding capacity is received for a date beyond the demand fence, the system will recalculate total demand for all days beyond the demand fence and prior to the order date to attempt to produce the total demand quantity necessary to fulfill the order. In calculating the increased quantities, the system uses a formula that prevents the total demand quantity for any day from exceeding the amount of material that was ordered for that day.

3 Claims, 7 Drawing Sheets

PRIOR ART

PARENT PART NUMBER        DATE
  100                  04/28/1992                      ────FLEX FENCES────
                                              FENCE START    RANGE    WORK      DEMAND FENCE
  CALCULATED                                     DATE       RANGE    DAYS     RANGE IN UNITS
  TOTAL DEMAND                                 05/04/1992     0        0
     90.00              FORECAST               05/11/1992    10        5       90.00-110.00
                          90.00                05/18/1992     9        5       81.90-119.90
  ORDER TO CUSTOMER/FGI                        05/26/1992     8        5       75.35-127.49
            90.00

DATE   04/26   04/27   04/28   04/29   04/30   05/01   05/02
CALC    0.00   90.00   90.00   90.00   90.00  100.00    0.00
CURR    0.00   90.00   90.00   90.00   90.00  100.00    0.00

DATE   95/03   05/04   05/05   05/06   05/07   05/08   05/09
CALC    0.00  100.00  100.00  100.00  100.00  100.00    0.00
CURR    0.00  100.00  100.00  100.00  100.00  100.00    0.00

DATE   05/10   05/11   05/12   05/13   05/14   05/15   05/16
DALC    0.00  100.00  100.00  100.00  100.00  100.00    0.00
CURR    0.00  100.00  100.00  100.00  100.00  100.00    0.00

FIG. 7

METHOD FOR DETERMINING FLEXIBLE DEMAND IN A MANUFACTURING PROCESS

This application is a continuation of application Ser. No. 07/884,599, filed May 15, 1992, now abandoned.

FIELD OF THE INVENTION

This invention relates to computer systems and more particularly to such systems used in manufacturing planning. Even more particularly, the invention relates to a computer system method for determining the demand for purchased materials independent of the manufacturing production demand.

BACKGROUND OF THE INVENTION

Traditional manufacturing systems use customer orders and marketing forecasts to predict the quantity of product needed at any given time. This process is based upon scheduled batch manufacturing techniques where products are created based upon a weekly or monthly schedule. Usually these products are produced as subassemblies or fabricated parts which are scheduled based upon the monthly requirement of the finished products. These subassemblies are then assembled into the final product to fill the customer orders, or placed into finished goods.

Formalized computer systems have been developed to assist in the traditional scheduling and tracking of these batch subassemblies or fabricated parts, as well as buying the required raw material. These systems are called Manufacturing Resource Planning (MRP) systems. The prevailing manufacturing methodology in the Far East, commonly referred to by the adopting Japanese as Kanban Flow Manufacturing, is often called Just-In-Time (JIT) by western manufacturers.

In traditional batch manufacturing, raw material is ordered well in advance and kept in a storeroom. Once the assembly or fabricated part is scheduled, a work order is released, and the parts required to produce the assembly are issued based upon a planned start date and start quantity. Subassembly parts are often produced in the same manner as the final product, thus, after being produced, the subassemblies are stored until they are needed for a final assembly. Because of the length of the process, a large inventory of finished goods is often needed to satisfy a fluctuating customer demand. This schedulized manufacturing makes customer responsiveness very slow.

The number of days that it takes to complete a product from the time the first, lowest-level, manufactured component or subassembly is produced until the final product is shipped is called the manufacturing lead time. A long lead time, caused by the subassembly manufacturing techniques, makes it difficult to react quickly to changing customer demand. The lengthy process of long manufacturing lead times, queues for each subassembly, and frequent trips to the storeroom place a long period of time between the customer's order and manufacturing's completion of that order.

One of the more significant problems caused by this process is that the production schedule is created well in advance, and cannot be altered easily. Because of this, the software used in this process also lacks the ability to easily adjust schedules. If the manufacturing process is to become more flexible, the system software used for scheduling must also become more flexible. In the traditional system, however, the production quantity, or total demand, is manually set by a master scheduler, and cannot easily be adjusted.

It is thus apparent that there is a need in the art for an improved method or apparatus which automatically determines the total demand on a daily basis. There is a further need in the art for such a system that can automatically adjust the demand, within customer supplied limits, to allow the quantity to vary for future dates. The present invention meets these and other needs.

SUMMARY OF THE INVENTION

It is an aspect of the present invention to determine the total product demand in a manufacturing system.

It is another aspect of the invention to project the demand on a daily basis.

Another object is to modify this projection each time new information is input to the system.

A further object is to restrict the modification to specific time periods.

The above and other aspects of the invention are accomplished in a system that determines the total demand for a product for each day over four time periods specified by the user of the system. Within the first time period, from the current date up to a demand fence, the total demand cannot be altered, since this quantity of products is already in production. For the next three periods beyond the demand fence, called the flex fence periods, the total demand for each day can vary by a percentage amount determined by the user. Each period can have a different percentage, and each period can have a different number of days, however all days within a period use the percentage for the period.

Once the quantities within the periods have been determined, the system produces orders for raw material sufficient to build the total demand plus the flex fence percentage. Thus the system has the flexibility to expand up to the amounts determined by the flex fences.

If an order is received for a date beyond the demand fence, and the order is larger that the total demand for that date, the system will recalculate total demand for all days beyond the demand fence date and prior to the order date to attempt to produce the total demand quantity necessary to fulfill the order.

In calculating the quantity from the flex fence percentages, the system uses a formula that adjusts the quantities in a manner that prevents the total demand quantity for any day from exceeding the amount of material that was ordered for that day.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
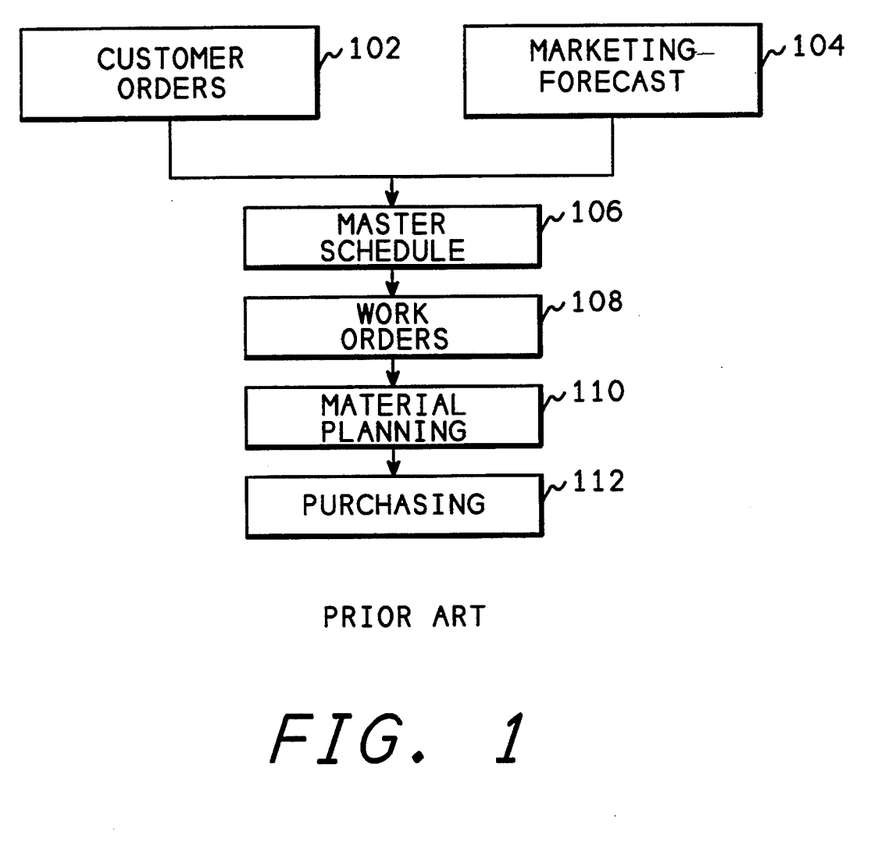
FIG. 1 shows a prior art manufacturing system.

FIG. 1 shows a prior art manufacturing method. Referring now to FIG. 1, customer orders 102 and a marketing forecast 104 are input to a master schedule 106. The master schedule 106 may be created by software or manually. It is typically done manually. Once the master schedule is determined, work orders 108 are created for the quantity of products to be produced. Once the work orders 108 have been created, a material planning system creates purchase orders for the amount of material needed to build the quantity of products and sends these purchase orders to purchasing, where vendors are contacted to procure the material.

Figure 2:
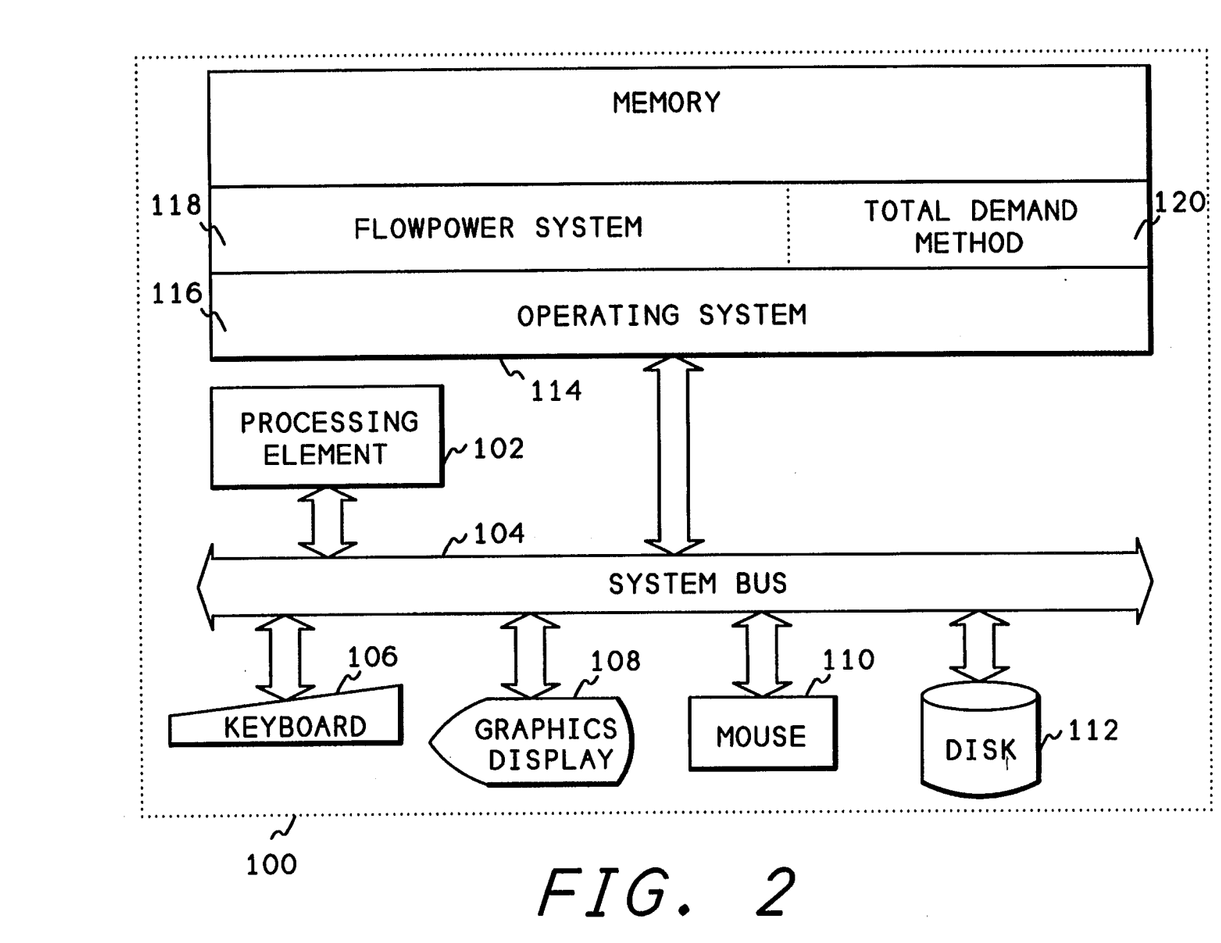
FIG. 2 shows a block diagram of a computer system and the software of the present invention.

FIG. 2 shows a block diagram of the hardware and software of the invention. Referring now to FIG. 2, a computer system 100 contains a processing element 102 which communicates to other elements of the computer system 100 over a system bus 104. A keyboard 106 allows user of the system 100 to input commands and data into the computer system 100, such as customer orders and marketing forecast data. Optionally, a mouse 110, allows the user to input graphical information into the computer system 100. A display 108 allows the computer system 100 to output information to the user of the system. A disk 112 stores the software of the present invention as well as all the data collected or calculated by the present invention.

A memory 114 contains an operating system 116 which is used by the present invention to access the keyboard 106, graphics display 108, mouse 110, disk 112, as well as other elements of the computer system 100. The total demand method software 120, of the present invention, is part of the "FLOW-POWER"(TM) manufacturing software 118 which performs other "DEMAND FLOW"(TM) manufacturing software functions for the user of the system. FLOWPOWER is a trademark of Nexteqx International, Inc., and DEMANDFLOW is a trademark of JIT Institute of Technology, Inc.

Figure 3:
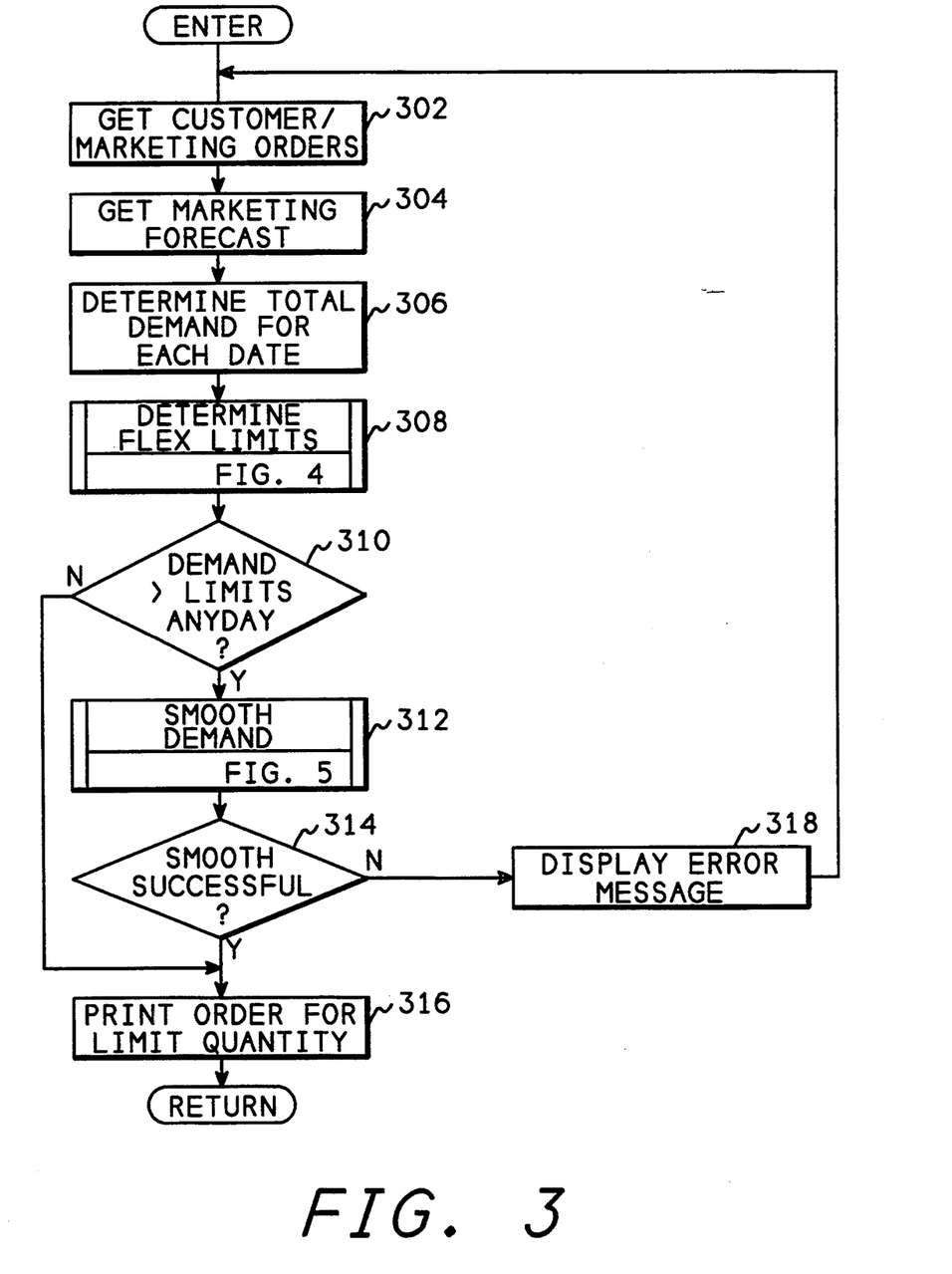
FIG. 3 shows a top level flowchart of the present invention.

FIG. 3 shows the stop level flowchart of the total demand method of the present invention. This method is called from the FLOWPOWER(TM) manufacturing software system 118 (FIG. 2) when a total demand quantity calculation is desired. Referring now to FIG. 3, after entry, block 302 gets customer or marketing orders, typically entered by a user on the keyboard 106 (FIG. 2). Marketing orders are for products that will be placed in finished goods, awaiting customer purchase. These orders extend for the number of days that includes four time periods, each set by the user of the system. The first time period is the time up to a demand fence. This is the time from the current day up to a point within which the total demand quantity cannot be altered because this quantity is currently being manufactured. This period might typically be a few days, however, it could be longer based upon the manufacturing lead time and the time necessary to acquire raw materials.

The next three time periods are called flex fences, since the total demand quantity of product to be produced during these periods is flexible, within percentage limits set by the user. The user can set different flex percentages for each of the periods, and these percentages reflect the amount of variance allowable in the total demand quantity to be produced during these periods.

After obtaining customer orders, block 302 transfers to block 304 which obtains a marketing forecast for these same time periods. Block 306 determines the total demand for each date within the four periods. Within the first period, before the demand fence, the system selects only customer orders or marketing orders for shipment to finished goods. Beyond the first period, the system selects the greater of orders or marketing forecast as the total demand for each day. Block 308 then calls FIG. 4 to determine the flex limits for each day within the periods.

After determining the flex limits, block 310 determines whether the total demand is greater than the flex limit for any of the days within the four periods. If not, block 310 transfers to block 316 which prints order quantities for the amount of raw material necessary to build the quantity of product determined by the upper flex limit for each day. This information is then sent to a purchasing system, which may determine the amount of raw material already on hand and order only the additional material needed.

Figure 5:
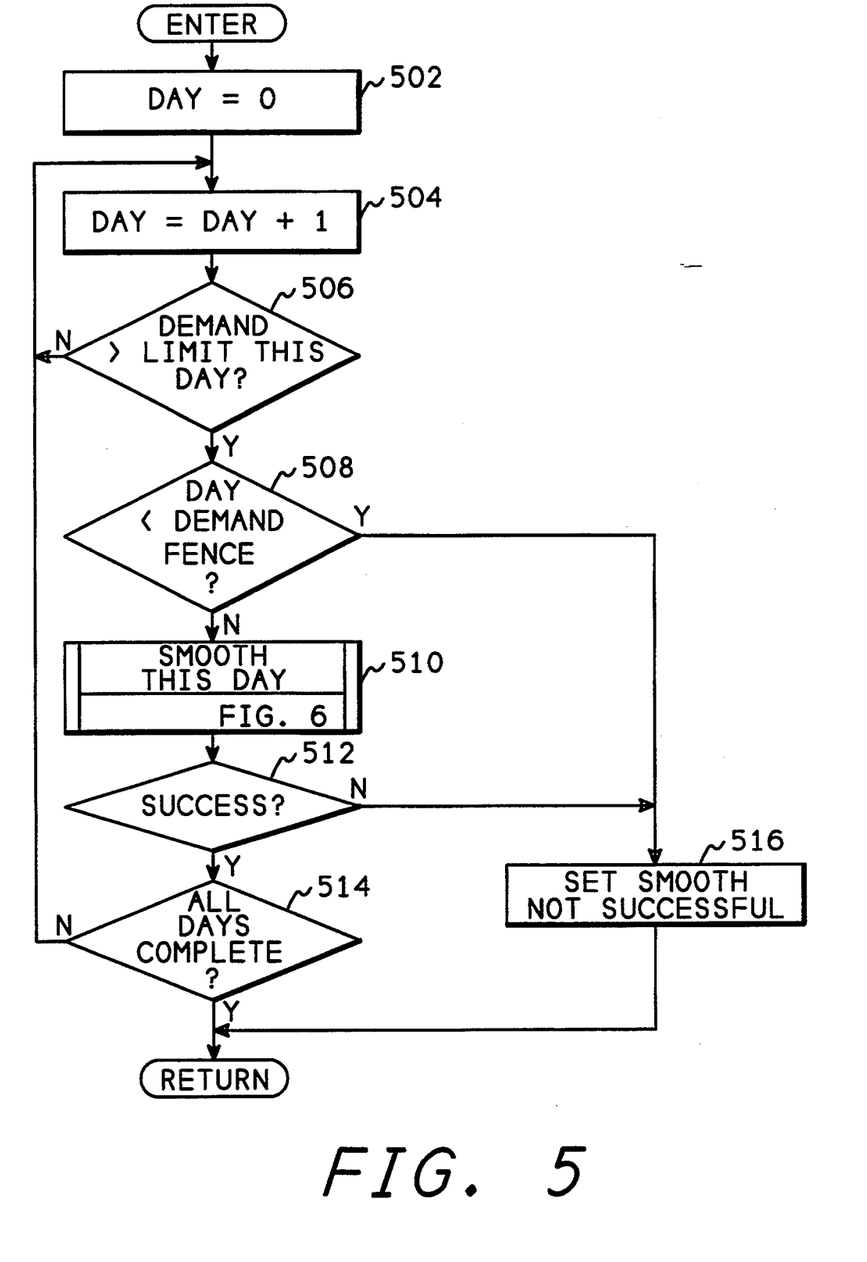
FIG. 5 shows a flowchart of the smoothing method of the invention.

If the total demand for any day exceeds the flex limit for the day, block 310 goes to block 312 which calls FIG. 5 to attempt to smooth the total demand quantity for previous days in order to provide the requested quantity. Block 314 determines if the smoothing was successful, and if so, transfers to block 316 to print the order for the raw material.

If the smoothing was not successful, block 314 transfers back to block 318 which displays an error message showing that the total demand quantity violates the amount of raw material available. Control then goes back to block 302 to allow the user to correct the situation.

Figure 4:
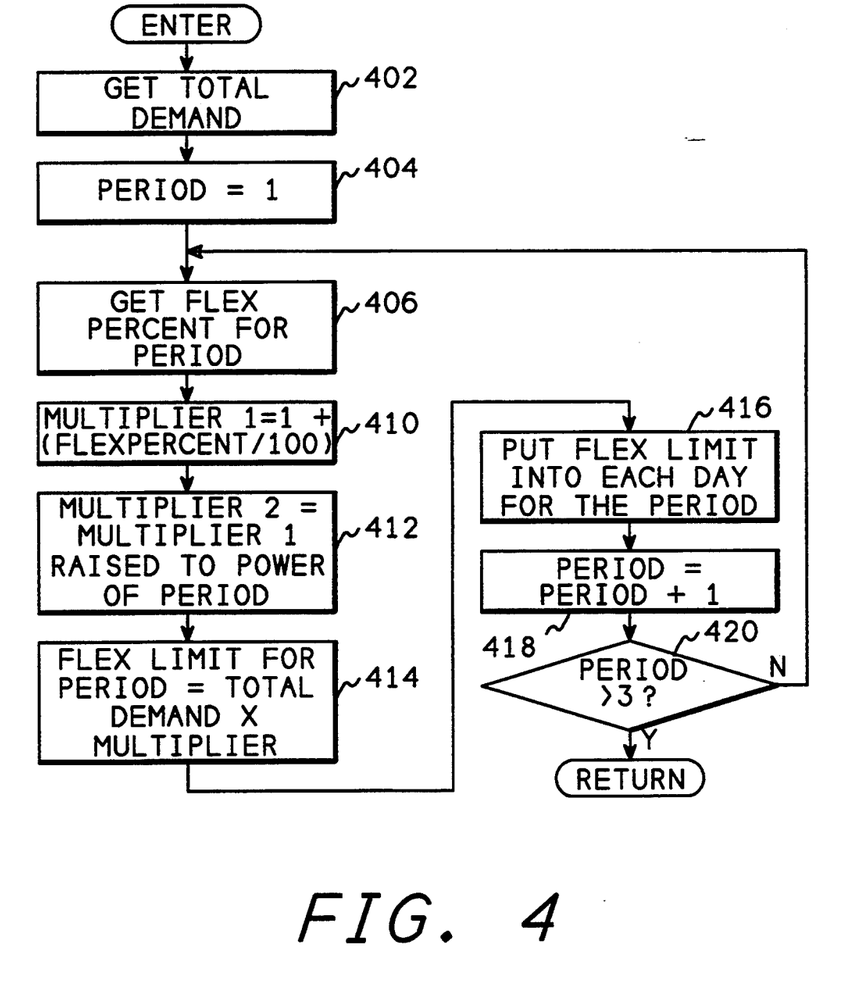
FIG. 4 shows a flowchart of the determine flex limits method of the invention.

FIG. 4 shows a flowchart of the determine flex limits process called from FIG. 3, block 308. The flex limits are set using the formula:

$$Dr_{ffL} = DR\,[1 + X\,\%/100]^N$$

where:

$Dr_{ffL}$ is the Flex Fence Limit Value for the future period

Dr is the daily rate for Total Demand

X is the flex percentage for the period

N is the future flex period

For Example, consider three future periods having flex percentages of 10%, 9%, and 8% respectively, and the daily rate total demand at the beginning of the first period of 32. The maximum daily rate total demand for the days of each of these future periods would be:

| Period 1 | $35.20 = 32\,[1 + 10/100]^1$ |
| Period 2 | $38.02 = 32\,[1 + 9/100]^2$ |
| Period 3 | $40.31 = 32\,[1 + 8/100]^3$ |

Referring now to FIG. 4, after entry, block 402 gets the total demand for the demand fence day, that is, the last day prior to the first flex period, and block 404 then sets the variable PERIOD to 1. Block 406 gets the flex percent for the period set in the PERIOD variable. This value is input by the user of the system to allow the user to set the maximum total demand quantity for each of the three flex periods. The flex percentage for each period is set separately, allowing the user to set the same or a different percentage for each period.

Block 410 then sets the value of a variable MULTIPLIER1 to one plus the flex percent divided by 100. For example, if the flex percent is 10%, MULTIPLIER1 would be set to 1.1. Block 412 sets the value of a variable MULTIPLIER2 to the value of MULTIPLIER1 raised to the power of the variable PERIOD, and block 414 then sets the flex limit for the period to the total demand multiplied by MULTIPLIER2. Block 416 puts the flex limit for the period into each day of the period, and block 418 increments the PERIOD variable. If all three periods have not yet been calculated, block 420 returns to block 406 to calculate the next period, otherwise, block 420 returns to FIG. 3.

FIG. 5 shows a flowchart of the smooth demand process called from block 312 of FIG. 3. This process attempts to adjust the total demand in all days prior to a customer order required date in order to satisfy a large demand on the customer order date. To accomplish this, it processes each day of the four periods to determine if the total demand for that day exceeds the flex limit for the day, and if it does, each previous day is then processed to determine if the total demand can be increased.

Referring now to FIG. 5, after entry, block 502 sets the value of a variable DAY to 0. Block 504 increments DAY, and block 506 determines if the total demand for the day exceeds the flex limit for the day. If the flex limit is not exceeded, block 506 transfers back to block 504 to process the next day.

If the flex limit is exceeded for this day, block 506 goes to block 508 which determines whether the date for this day occurs before the demand fence. Since the total demand cannot be altered before the demand fence, if this day occurs before the demand fence, block 508 goes to block 516 which sets a smooth not successful flag before returning to FIG. 3.

Figure 6:
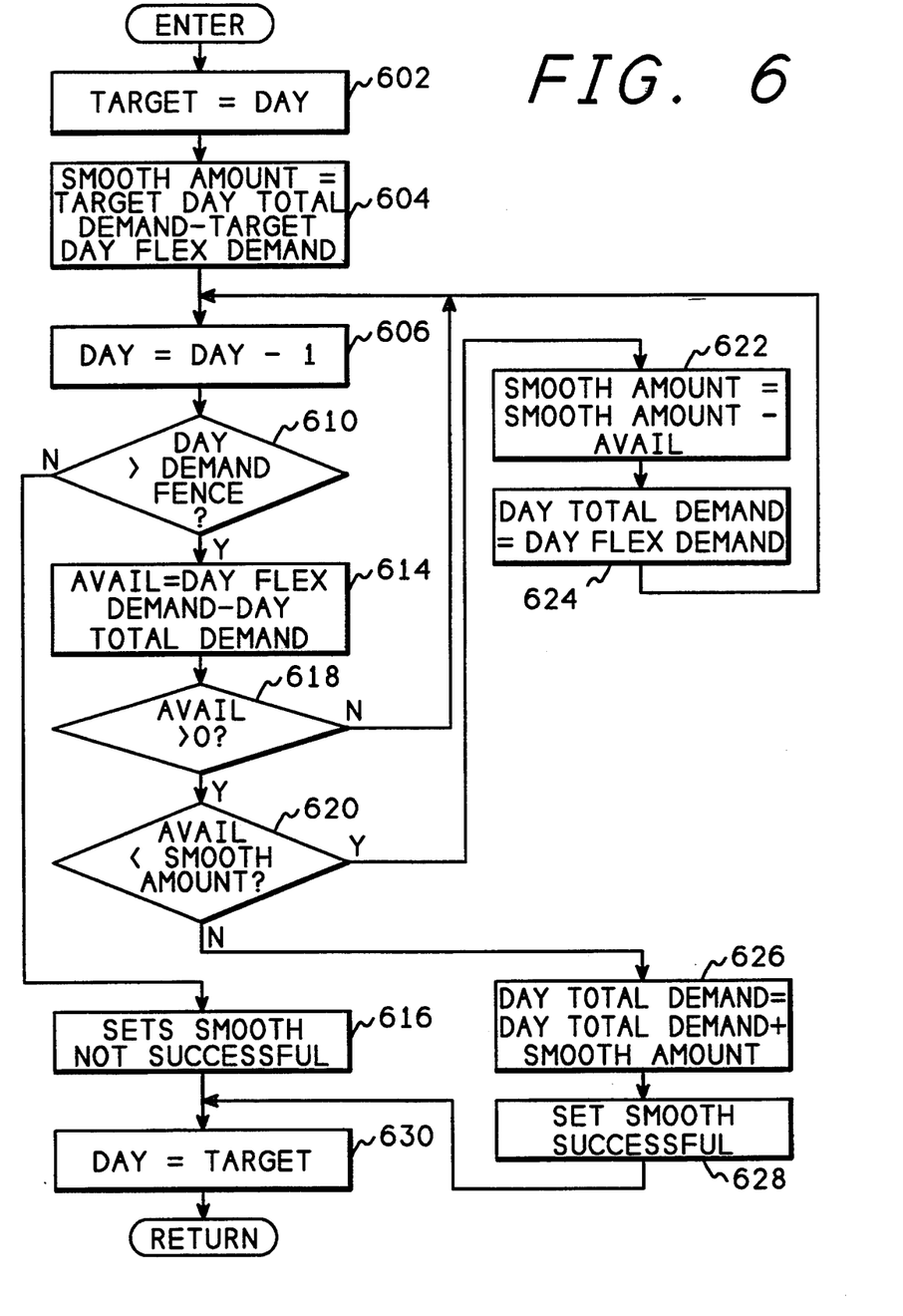
FIG. 6 shows a flowchart of the smoothing method for a single day.

If the day is beyond the demand fence, block 508 goes to block 510 which calls FIG. 6 to attempt to smooth the total demand for this day. After returning from FIG. 6, block 512 determines if the process of FIG. 6 was successful, and if not, block 512 goes to block 516 which returns a not successful flag to FIG. 3, indicating the smoothing is not possible.

If the process of FIG. 6 was successful for this day, block 512 goes to block 514 which determines if all days have been processed, and if not, block 514 returns to block 504 to process the next day. The number of days to be processed is determined by the size of the flex periods set by the user of the system.

If all days have been processed, block 514 returns to FIG. 3 indicating that smoothing was successful.

FIG. 6 shows a flowchart of the smoothing method for a single day called from block 510 of FIG. 5. Referring now to FIG. 6, after entry, block 602 sets TARGET, which is the customer required ship date, to the current DAY, since this process will attempt to smooth the total demand for this day. Block 604 sets the SMOOTH AMOUNT to the total demand of the target day minus the flex demand for the target day, thus SMOOTH AMOUNT is the quantity that must be increased in previous days in order to provide the requested quantity on the target day.

Block 606 decrements DAY, and block 610 determines if all days have been processed. Since the total demand for days before the demand fence cannot be altered, there is no need to process any days earlier than the demand fence. If all days have been processed, block 610 goes to block 616 which sets the smooth not successful flag. Block 630 then resets the value of DAY before returning to FIG. 5.

If the day to be processed is beyond the demand fence, block 610 goes to block 614 which calculates the increase available for this day as the flex demand for the day less the total demand for the day. Block 618 then determines if any increase is possible, and if not, goes to block 606 to process the next day.

If the total demand for this day can be increased, block 618 goes to block 620 which determines whether the amount available for this day is less than the smooth amount, thus whether this day can absorb the entire remaining smooth amount. If not, block 620 goes to block 622 which decreases the smooth amount by the amount available for this day, and block 624 sets the total demand for this day to the flex demand, thus raising the total demand for this day to the maximum. Block 624 then returns to block 606 to process the next day.

If this day can absorb the total smooth amount, block 620 goes to block 626 which increases the total demand for this day by the smooth amount. Block 628 then sets the smooth successful flag before transferring to block 630 to return to FIG. 5.

Figure 7:
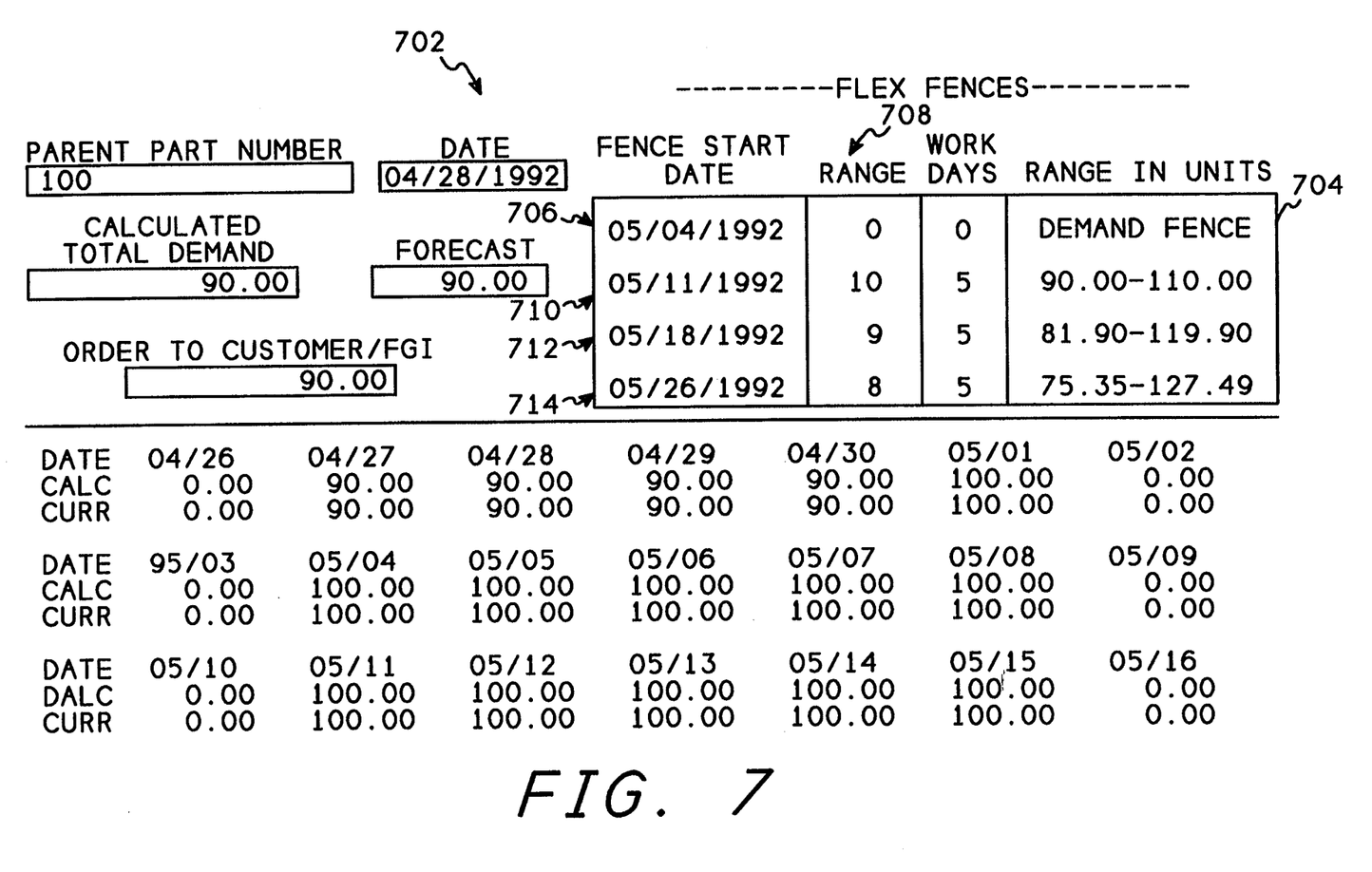
FIG. 7 shows a screen display from the invention containing an example of the results of applying the method of the invention.

FIG. 7 shows an example output screen using this method. Referring now to FIG. 7, screen 702 contains a flex fence area 704 which indicates the flex fence values, in percentages and actual quantity, for the four periods. The first period 706 is the demand fence, and the range (percentage) for this period is zero, since the total demand cannot be changed within the demand fence.

For the next three periods, 710, 712, and 714, the range indicates the percentage of flex, and the range in units indicates the amount in units that the total demand for each day in the period can be increased or decreased.

Following is an example that shows how the smoothing method of the present invention adjusts total demand quantity to meet a requirement. For this example, the total demand for each day is 120 units, and the demand fence occurs at day 2. For the first flex period, the flex percentage is 10% and the number of days in the period is 4. For the second flex period, the flex percentage is 9% and the number of days in the period is 8. For the third period, the flex percentage is 8%, and the number of days in the period is 12. Table 1 shows the total demand and actual orders for the next 9 days.

TABLE 1

|  | 1 | 2 | 3 | 4 | 5 | 6 | 7 | 8 | 9 |
|---|---|---|---|---|---|---|---|---|---|
| Orders | 120 | 120 | 60 | 0 | 0 | 0 | 0 | 0 | 0 |
| Total Demand | 120 | 120 | 60 | 0 | 0 | 0 | 0 | 0 | 0 |

Table 2 shows the addition of a customer order for 325 units at day 5.

TABLE 2

|  | 1 | 2 | 3 | 4 | 5 | 6 | 7 | 8 | 9 |
|---|---|---|---|---|---|---|---|---|---|
| Orders | 120 | 120 | 60 | 0 | 325 | 0 | 0 | 0 | 0 |
| Total Demand | 120 | 120 | 60 | 0 | 325 | 0 | 0 | 0 | 0 |

The flex limit for days 1 and 2 cannot be changed, since they are within the demand fence of 2 days. The flex limit for days 3–5, however, is 132, that is 120 , [1.1][1]. This new customer order causes the total demand for day 5 to exceed the flex limit for day, therefore the system must smooth the additional amount over the previous two days, if possible. Table 3 shows the result of processing by the smoothing method of FIGS. 5 and 6, described above.

TABLE 3

|  | 1 | 2 | 3 | 4 | 5 | 6 | 7 | 8 | 9 |
|---|---|---|---|---|---|---|---|---|---|
| Orders | 120 | 120 | 60 | 0 | 325 | 0 | 0 | 0 | 0 |
| Smooth | 0 | 0 | +61 | +132 | −193 |  |  |  |  |
| Total Demand | 120 | 120 | 121 | 132 | 132 | 0 | 0 | 0 | 0 |

The system placed the largest changes into the last days, thus increased flexibility is achieved by delaying the increase as long as possible.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In a computerized manufacturing system, a computer implemented method for determining a production quantity for a plurality of flex periods, and ordering material for said production quantity during said plurality of flex periods, said method comprising:

(a) accepting a quantity of flex periods from a user of the system and assigning each flex period a sequential number, wherein said flex periods occur after a demand fence date;

(b) accepting a daily rate total demand from the user of the system, wherein said daily rate total demand equals said production quantity at said demand fence date;

(c) accepting a flex period percentage for each of said flex periods from the user;

(d) accepting a flex period number of days, one said flex period number of days for each said flex periods;

(e) calculating a flex period total demand for each of said flex periods, comprising the steps of (e1) calculating a first multiplier by dividing said flex period percentage for said flex period by one-hundred and adding one to a result of said dividing to produce said first multiplier, (e2) calculating a second multiplier by raising said first multiplier to the power of said sequential number assigned to said flex period in step (a), and (e3) calculating said flex period total demand for said flex period by multiplying said second multiplier by said daily rate total demand, and (e4) assigning said flex period total demand to each day of said flex period;

(f) accepting at least one customer order from a user of said system;

(g) for each said customer order accepted, increasing said production quantity for all days in each of said flex periods prior to a day of said customer order and after said flex fence date, wherein said production quantity for each of said days does not exceed said flex period total demand set for said day; and (h) placing an order for material for said production quantity for each of said flex fence periods.

2. The computer implemented method of claim 1 wherein step (g2) further comprises the steps of:

(g2a) increasing said production quantity starting with said day of said customer order and increasing said production quantity for previous days until said customer order is satisfied.

3. The computer implemented method of claim 2 wherein step (g2a) further comprises the step of increasing said production quantity for each sequentially previous day, starting with said day of said customer order, to a maximum allowed amount within said flex period total demand for each sequentially previous day, until a total amount of increase in said production quantity equals an amount of said customer order.

* * * * *